: # 3,420,897
TREATMENT OF HYDROCARBON
OXIDATION MIXTURES
Joseph L. Russell, Ridgewood, N.J., and Harry Olenberg, Bronx, N.Y., assignors to Halcon International, Inc., a corporation of Delaware
No Drawing. Continuation-in-part of application Ser. No. 139,620, Sept. 21, 1961. This application May 7, 1965, Ser. No. 454,217
U.S. Cl. 260—631    3 Claims
Int. Cl. C07c 35/08

This application is a continuation-in-part of parent application Ser. No. 139,620 filed Sept. 21, 1961 and now abandoned.

This invention relates to the treatment of product mixtures which are obtained as a result of the oxidation of a hydrocarbon in the presence of a boron compound such as boric acid or an anhydride thereof. More specifically, the invention is concerned with an improved process involving the hydrolysis of a reaction mixture obtained by the molecular oxygen oxidation of a hydrocarbon in the presence of a boron compound such as boric acid or an anhydride thereof.

In the oxidation of hydrocarbons such as cyclohexane, the selectivity of the oxidation to the corresponding alcohol or mixture of alcohols has been found to be greatly improved by carrying out the oxidation in the presence of a boron compound which is capable of reacting with oxidation products to form borate or per borate esters. The mixture resulting from the oxidation is thereafter treated such as by hydrolysis to separate and recover valuable hydrocarbon oxidation products. In order to carry out such processes economically, it is necessary that this treatment of the oxidation reaction product mixture be conveniently and easily carried out wtih the efficiency recovery both of the hydrocarbon oxidation products and of boric acid.

One method of accomplishing the hydrolysis and separation of the reaction products has been first to separate unreacted hydrocarbon from the oxidation reaction mixture by distillation and subsequently to hydrolyze the remaining mixture of reaction products. Thereafter, the hydrolysis mixture is separated into hydrocarbon oxidation products and boric acid. However, during the initial hydrocarbon separation by distillation, decomposition of reaction products occurs with undesirable yield loss. Also, not only is the reaction mixture which is obtained after hydrocarbon removal extremely difficult to handle and further treat but also separation of boric acid from final products is hindered and can be achieved only with excessive investment and operating costs.

It is an object of the present invention to provide an improved method for the hydrolysis of products formed by the oxidation of hydrocarbons in the presence of a boron compound.

Other objects will be apparent from the following description of the invention:

In accordance with the present invention, the mixture which is hydrolyzed not only contains the products of the oxidation reaction in the presence of the boron compound and any unreacted boron compound but also the mixture contains by weight at least about 20% of hydrocarbon.

In one especially preferred embodiment of the invention, a hydrocarbon such as cyclohexane is oxidized with molecular oxygen in the presence of a boron compound such as boric acid or an anhydride thereof. The oxidation is continued until up to about 50% of the hydrocarbon is reacted. The resulting reaction mixture is then hydrolyzed with an appropriate hydrolyzing medium, preferably a substantially saturated aqueous solution of boric acid. Solid boric acid is sparated as by filtration from the hydrolysis mixture and the resulting liquid mixture is separated into an aqueous phase and an organic phase. The organic phase is subsequently treated for the recovery of the desired hydrocarbon oxidation products. The aqueous phase is advantageously recycled to the hydrolysis.

Other embodiments of the invention are possible. For example, the hydrocarbon oxidation can be carried to substantial completion and sufficient hydrocarbon added to the reaction mixture to comprise at least about 20% of the resulting admixture prior to hydrolysis.

Where very low hydrocarbon oxidation conversions are achieved, a portion of the unreacted hydrocarbon can be removed prior to the hydrolysis.

Still other embodiments of the invention are possible.

Through practice of the present inventive process, outstanding process improvements are achieved as contrasted with prior processes. Whereas the oxidation reaction mixture after separation of the unreacted hydrocarbon as is practiced in prior processes tends to be a viscous semisolid material which is extremely difficult to handle, in practice of this invention the oxidation products are soluble in the hydrocarbon thereby forming a mixture which is readily handled. Still further, the yield losses which accompany a distillation of unreacted hydrocarbon from products of the oxidation reaction prior to the hydrolysis are avoided. These losses arise due to the thermal instability of the products of oxidation in a concentrated state. Also, the mixture after hydrolysis is much more readily handled and separated as a result of the presence of the stated amount of hydrocarbon therein. Solid boric acid is obtained and separated in accordance with this process conveniently and readily. A separation of the hydrolysis mixture into organic and aqueous phases is readily accomplished. By way of contrast, in prior processes when hydrocarbon is removed prior to hydrolysis, separation of the hydrolysis mixture into aqueous and organic phases is much more difficult. Emulsions form much more readily when hydrocarbon has been removed.

An outstanding advantage of the invention is that upon separation of the hydrolysis mixture into aqueous and organic phases, the organic phase so separated contains only very small amounts of boric acid as compared to prior processes where the hydrocarbon was separated before hydrolysis. The presence of the hydrocarbon in admixture with the hydrolyzed oxidation products greatly changes the distribution coefficient of boric acid between the aqueous and organic phases such that much less boric acid is contained in the organic phase. This aspect of the present process is especially important insofar as maximizing oxidation product yields is concerned since any free boric acid contained in the organic phase tends to reesterify product alcohol during the subsequent distillation to separate the hydrocarbon, thus resulting in loss of yield of the desired product alcohol.

It is necessary in accordance with the present invention that the mixture to be hydrolyzed comprising oxidation reaction products resulting from the hydrocarbon oxidation in the presence of the boron compound contain at least about 20% by weight of hydrocarbon. Preferably, the mixture comprises 20 to 95% hydrocarbon and most desirably about 50 to 90% by weight hydrocarbon.

The present invention is applicable to the hydrolysis of reaction mixtures resulting from the molecular oxygen oxidation of hydrocarbons in the presence of a boron compound which is capable of reaction with alcohols formed by the hydrocarbon oxidation. Boron compounds are boric acid, meta boric acid, tetra boric acid and boron anhydride. Advantageously, the invention is employed in connection with the hydrolysis of reaction mixtures resulting from the oxidation with molecular oxygen of cycloalkanes as illustrated by cyclohexane, cyclo-octane, methyl cyclohexane, diethyl cyclo-octane, and the like. However, the invention is applicable to the hydrolysis of the reaction mixture resulting from the molecular oxidation of substantially any hydrocarbon in the presence of a boron compound such as boric acid. Illustrative of such other hydrocarbons are straight or branch-chain aliphatic hydrocarbons, including pentane, hexane, decane, and the like.

The oxidation conditions generally involve temperatures in the range of about 75° to 300° C., desirably 100° to 200° C. and preferably 140° to 180° C. During the oxidation reaction, there is necessarily efficient removal of water which is formed by oxidation and esterification or which is contained in the feed air or formed by dehydration of the boron compound. The reaction pressure is maintained generally at a sufficiently high level to insure that the hydrocarbon remains in the liquid phase during the reaction. Illustrative pressures are in the range of about 10 to 500 p.s.i.g.

The boron compound which is used during the oxidation is employed in such amount to promote the oxidation reaction selectivity. Desirably, the boron compound is used in amount sufficient to provide the equivalent of one (1) mol of boric acid calculated as $H_3BO_3$ per mol of alcohol formed during the oxidation. It is especially desirable to use higher amounts of the boron compound, although lesser amounts can be employed.

The oxidation is most advantageously conducted such that about 3 to 20% of the hydrocarbon is reacted. The invention can operatively be practiced wherein greater percentages of the hydrocarbon are oxidized but generally this is somewhat less desirable. The reaction mixture from the oxidation can, if desired, be distilled to separate a certain amount of the unreacted hydrocarbon. It is necessary, however, in carrying out the invention that the mixture to be hydrolyzed contain at least 20% hydrocarbon. It is, therefore, preferred that at least 20% of hydrocarbon be left in the reaction mixture and most desirably all of the hydrocarbon is left in the mixture.

The oxidation reaction mixture is mixed with at least sufficient water to hydrolyze all of the borate ester contained therein. It is usually desirable to use water in amount in excess of the minimum hydrolysis amount. The hydrolysis water can be conveniently added in the form of a saturated aqueous boric acid solution. The use of such boric acid solutions is especially advantageous in that the quantities of solid boric acid recovered per pass are maximized using such solutions, and the recovered hydrolysis solutions are conveniently reused subsequently in the process.

Hydrolysis temperatures generally in the range of 10° to 100° C. are suitable, although higher temperatures can be used. Hydrolysis times ranging from a few seconds up to one (1) hour or more can be employed.

During hydrolysis, boric acid is precipitated in the form of finely divided solid particles. This hydrolysis slurry mixture is desirably subjected to filtration and/or centrifugation in order to separate this solid boric acid which can be recycled to the oxidation step. It is usually desirable to subject the hydrolysis slurry to a settling in order to concentrate the slurry before separation of the boric acid. Most desirably, the separated boric acid is washed with a small amount of water and recycled to the oxidation reaction wherein it is at least partially dehydrated prior to commencement of the oxidation. The filtrate liquid comprises a mixture of an organic phase containing the unreacted hydrocarbon and the hydrocarbon oxidation products which mainly comprise the product alcohol and an aqueous phase which comprises an aqueous boric acid solution. This filtrate is separated into the aqueous and organic phases as by settling and decantation. Most suitably and preferably, the aqueous phase is recycled to the hydrolysis step wherein it is employed as the hydrolysis medium. The organic phase is washed with small amounts of water to remove residual boron compounds to a few parts per million in the organic phase. It is subsequently treated to separate hydrocarbon from the oxidation products. The wash water is combined with the recycling aqueous boric acid. Separated hydrocarbon is most desirably recycled to the oxidation reaction.

In order to more clearly describe the practice of the present invention, the following is a general description of a preferred embodiment:

Cyclohexane in amount of about 1,000 parts is admixed with about 200 parts of boric acid. This mixture is heated to about 170° C. and nitrogen is passed through until the boric acid is substantially completely dehydrated to meta boric acid, with the water of dehydration being continuously removed. Thereafter, a mixture of 4% oxygen and nitrogen is passed through the cyclohexane-boron acid mixture until about 15% of the cyclohexane has undergone an oxidation reaction. If desired, suitable oxidation catalysts such as cobalt naphthenate can be employed in the oxidation.

The entire resulting reaction mixture without separating cyclohexane is contacted with about 100 parts of a saturated aqueous solution of boric acid at about 20° C. Substantially complete hydrolysis of the reaction mixture occurs almost immediately. Solid boric acid precipitates in the form of small solid particles. The hydrolysis mixture, desirably after cooling, is filtered to remove the solid boric acid therefrom. The filtered boric acid can be washed with a very small amount of water and the washed boric acid is suitable for reuse in the cyclohexane oxidation reaction.

Filtrate comprising a saturated boric acid solution together with a mixture of unreacted cyclohexane and cyclohexane oxidation reaction products predominantly comprising cyclohexanol are separated into an organic phase and aqueous phase. The aqueous phase is separated by decantation and can be directly recycled to the hydrolysis step. Water from the boric acid wash can be added to this recycled boric acid solution.

The organic phase which comprises cyclohexane and oxidation products thereof is appropriately extracted with a very small amount of water in order to remove the last traces of boric acid. This wash water can be combined with the saturated boric acid solution for reuse in the hydrolysis.

Thereafter the mixture of cyclohexane and oxidation products thereof can be treated as desired to recover one or more of the component substitutes.

It is necessary for successful practice of this invention that the mixture to be hydrolyzed contain at least about 20% by weight of hydrocarbon. In the most convenient and preferred practice of the invention, the hydrocarbon to be oxidized is subjected to a partial oxidation, and unreacted hydrocarbon in at least the amount above indicated is permitted to remain in the mixture during hydrolysis. Alternately, the hydrocarbon can be completely oxidized and for purposes of the hydrolysis the required amount of the same or a different hydrocarbon can be added just prior to the hydrolysis reaction.

Although it is most desirable that a saturated aqueous boric acid solution be employed in the hydrolysis, it will be apparent that solutions containing no boric acid up to the saturation amount can be employed.

By way of contrast, where the oxidation reaction mixture is first treated to remove unreacted hydrocarbon before the subsequent hydrolysis, boric acid is produced in such a form as to render the resulting mixture substantially unmanageable. The boric acid is not at all easily separated from the other components of the hydrolysis mixture and requires an elaborate and exhaustive sequence of steps before the boric acid can be reused in the oxidation. Net yields of desirable oxidation products are lower with this technique than with the methods of this invention.

Example 1

Cyclohexane in amount of about 2,711 grams is mixed with about 450 grams of boric acid. This mixture is charged to a glass-lined reactor equipped with a vapor take-off, a condenser, and a water separator.

A gaseous mixture of about 4% oxygen in nitrogen is passed through the mixture at a rate of about 4.0 liters per minute, for 5 hours. Reaction temperature is maintained at about 165° to 167° C., and the reaction pressure is maintained at about 120 p.s.i.g.

During the reaction, vapors are continuously removed from the reactor, condensed, water is separated, and the cyclohexane is returned to the reaction.

The reaction mixture which comprises by weight about 78% cyclohexane and the rest excess dehydrated boric acid, and reaction products, is admixed with high agitation with 600 grams of a substantially saturated aqueous boric acid solution in order to hydrolyze the borate esters. The hydrolysis takes place at about 25° C. and the hydrolysis time is about one (1) hour.

The resulting-hydrolysis mixture comprises a slurry of solid boric acid particles in liquid comprising cyclohexane, aqueous boric acid solution, cyclohexanol and cyclohexanone. This slurry is settled and an upper liquid substantially free of boric acid is separated from the settler. The more concentrated slurry is removed from the bottom of the settler and filtered to separate solid boric acid, the solid boric acid is washed with a small amount of water and recycled to the oxidation step.

The mother liquor from the filtration is combined with the upper liquid stream from the settler and settled in a decanter. A lower aqueous phase comprising a substantially saturated aqueous boric acid solution is separated and recycled to the hydrolysis step. The upper organic phase mainly comprising cyclohexanol and cyclohexanone in cyclohexane is washed with a small amount of water and then distilled to separate cyclohexane overhead from a bottom product cyclohexanol-cyclohexanone fraction.

The wash water from the boric acid and organic phase washings is recycled to the hydrolysis.

The organic-phase distillation is carried out under reduced pressure to separate the cyclohexane overhead at about 400 mm. Hg and 135° F.

The product cyclohexanol and cyclohexanone fraction in amount of about 360 grams contains about 82% cyclohexanol, about 3% cyclohexanone and the remainder other oxygenated cyclohexane products.

Example 2

Cyclohexane in amount of about 1000 grams is admixed with about 45 grams of solid finely ground meta boric acid. This admixture is oxidized with a nitrogen-oxygen mixture containing 4% by volume oxygen at a temperature of about 165° C. and a pressure of about 120 p.s.i.g. The oxidation is continued until about 8% of the cyclohexane is reacted.

The resulting reaction mixture is admixed with high agitation with about 1000 grams of distilled water in order to hydrolyze the borate ester. The hydrolysis takes place at about 70° C. and the hydrolysis time is about 1 hour.

The resulting hydrolysis mixture is settled into 2 immiscible phases. The upper organic phase comprises cyclohexane, cyclohexanol and cyclohexanone whereas the lower aqueous phase comprises an aqueous boric acid solution. The hydrolysis mixture is readily separated by decantation with no problems of emulsification.

The organic phase is washed with about 30 grams of water in order to separate residual traces of boric acid. Again no emulsion problems are encountered. The washed organic phase is distilled to separate cyclohexane overhead from a bottom, cyclohexanol and cyclohexanone fraction as set forth in Example 1.

The aqueous boric acid solution phase from the hydrolysis is cooled to about 20° C. to crystallize the boric acid. The crystals are readily recoverable by centrifugation and are slurried in cyclohexane, dehydrated to meta boric acid, and returned to the oxidation.

Example 3

Example 2 is repeated except that the organic phase from the hydrolysis is treated with a small amount of aqueous NaOH and then water washed. No emulsification problems result.

By way of comparison, Example 2 is repeated except that the oxidation reaction mixture is first distilled under reduced pressure to separate the unreacted cyclohexane. The bottoms fraction comprising the borate ester mixture is hydrolyzed as described in Example 2. The resulting mixture forms a stable emulsion which persists for more than 1 hour.

The organic content of the aqueous phase is higher where the hydrocarbon is removed prior to hydrolysis. This interferes with boric acid crystallization resulting in the formation of crystals which are more difficult to recover. Also, the crystals contain occluded organic matter which lowers the sintering point of the crystals during dehydration. Removal of this organic matter results in the loss of valuable material.

In additional comparative examples, the procedures of Examples 2 and 3 are repeated except that the organic phase from the hydrolysis is distilled to separate cyclohexane before the resulting cyclohexanol and cyclohexanone fraction is water washed or caustic washed. Upon water washing or caustic washing the cyclohexanol and cyclohexanone phase, a stable emulsion is formed which requires prolonged settled periods before separating into an aqueous and organic phase.

The above comparative examples demonstrate the real advantages which are achieved through practice of the present invention. From the above, it can be seen that the hydrocarbon present during the hydrolysis should not be separated prior to the water washing step or problems of emulsification are encountered. The water washing step results in the removal of residual boric acid and facilitates high product recovery. Usually amounts of water of the order of 0.25 to 10% by weight of the organic phase from the hydrolysis are suitable at washing temperatures ranging from about 10° to 100° C.

We claim:

1. In a process for hydrolyzing the reaction products containing 20 to 95% unreacted cyclohexane resulting from the molecular oxygen oxidation of cyclohexane in the presence of a boron compound selected from the group consisting of boric acid, meta boric acid, tetra boric acid and boron anhydride, the improvement which comprises contacting said reaction products containing 20 to 95% by weight cyclohexane with water at a temperature in the range of about 10 to 100° C.

2. The method of claim 1 wherein an organic phase is separated from the hydrolysis mixture and washed with water.

3. In a process for hydrolyzing the reaction product mixture resulting from the molecular oxygen oxidation of cyclohexane in the presence of boric acid, meta boric acid, tetra boric acid, or boron anhydride and containing 20 to 95% unreacted cyclohexane, the improvement which comprises contacting the reaction products containing the unreacted cyclohexane with water, and separating the resulting mixture into an organic phase and an aqueous phase.

(References on following page)

References Cited

UNITED STATES PATENTS

| | | | |
|---|---|---|---|
| 1,947,989 | 2/1934 | Hellthaler et al. | 260—617 |
| 2,557,281 | 6/1951 | Hamblet et al. | 260—586 |
| 2,938,924 | 5/1960 | Simon et al. | 260—586 |
| 3,179,699 | 4/1965 | Waldmann et al. | 260—586 |
| 3,240,820 | 3/1966 | Olenberg et al. | 260—631 |

LEON ZITVER, *Primary Examiner.*

H. MARS, *Assistant Examiner.*

U.S. Cl. X.R.

260—586, 617, 639